Dec. 18, 1934.   F. J. PEASE   1,984,696
GENERATOR CONTROL
Filed April 18, 1931

INVENTOR
Frederick J. Pease
BY
Wheeler, Wheeler & Wheeler
ATTORNEYS

Patented Dec. 18, 1934

1,984,696

UNITED STATES PATENT OFFICE 1,984,696

GENERATOR CONTROL

Frederick J. Pease, Wauwatosa, Wis., assignor to Clum Manufacturing Company, Milwaukee, Wis., a corporation of Wisconsin Application April 18, 1931, Serial No. 531,079

10 Claims. (Cl. 171—229)

This invention relates to improvements in generator controls.

It is the primary object of the invention to provide a simple and inexpensive means for the complete control of battery charging from such a generator as is usually driven by means of an automobile engine.

I am aware of the fact that variable resistance elements have been incorporated in series with the field coil of a dynamo to control the dynamo output, but I have discovered that such a resistance is not successfully applicable to automotive practice in that it is impracticable thereby to wholly eliminate battery charging current in a generator of the usual type in which self-regulation is secured through a third brush supplying the field with current. A resistance element of any reasonable value is incapable of relieving the battery of a current tending to overcharge it. Furthermore, such resistance is relatively expensive and must be made relatively heavy because of a serious tendency to overheat. When a battery is completely charged any current, no matter how small, may do serious injury to the battery by overcharging it.

By the means herein disclosed I seek to, and do, subject a battery charging current in an automotive installation to complete control between the point of maximum charge and a point where no current whatever is flowing to the battery. Furthermore, I accomplish this with relatively inexpensive resistance means which is not subject to overheating and enables finer adjustment and more perfect control than has heretofore been possible.

By wholly eliminating generation of current through the device herein disclosed, I not only save the battery but also save the very considerable amount of power required to operate the generator. It is estimated that the driving of a generator by means of a relatively low power automobile engine may, at full charging output of the generator, consume as much as ten per cent of the total power available.

In the drawing.

Like parts are identified by the same reference characters throughout the several views.

Figure 1:
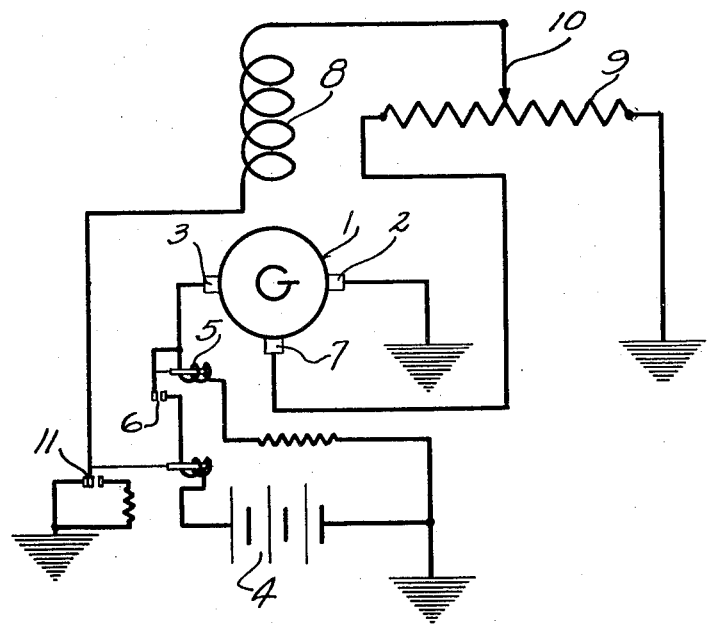
Figure 1 represents a diagrammatic illustration of generator and battery and control circuits embodying the invention.

The generator 1 is a conventional type of generator having brushes 2 and 3 connected in series with a battery 4. The brush 2 and one terminal at the battery may be grounded. The brush 3 is connected with the other terminal of the battery either directly or through a conventional relay or so-called cut-out 5 whereby the battery circuit is interrupted through switch 6 when the generator output falls below a predetermined minimum.

Generators used for automotive purposes are usually provided with third brushes 7 for supplying current to the field coils 8. It is the present standard practice to attempt to fix the third brush in such a position about the armature that the current output thereof will satisfy the requirements of the user of the particular vehicle. If the current output is to be maintained at anything like its proper value, it is necessary to correct the setting of the brush to meet each new condition to which the device is subject. It is common practice to reduce the charging rate in the summer time when starting motor demands on the battery are light and the days are longer, requiring less use of the headlamps. It is customary to correct the setting while touring or otherwise operating the vehicle with any great continuity. A further correction is usually made in winter to increase the charging rate again to meet increased demands on the battery.

In accordance with this invention the position of the third brush may remain fixed, and control of the generator output is entirely effected through a potentiometer mounted on the vehicle dash or otherwise fully accessible to the operator so that he may instantly accommodate his generator output to the condition of the battery without being obliged to obtain the services of a repair man.

The potentiometer includes a resistance 9 connected between the third brush 7 and the ground. This resistance may be of very low value. Assuming that the resistance of field 8 corresponds to ordinary practice and amounts to about two ohms, the resistance 9 may have a value of only three ohms. A moving contact 10 operates across this resistance and is connected with the field coil, replacing the usual connection directly between the field coil and the third brush. The field coil in turn is grounded, either directly or through a relay switch 11 such as is sometimes used in conventional generator circuits to incorporate an added resistance 12 in the field circuit when the generator output becomes excessive.

With the circuit disclosed, the third brush is at all times connected through resistance 9 directly with the ground in shunt with the field coil. One advantage of the potentiometer in this particular circuit consists in the fact that the adjustment of the moving contact 10 not only includes a greater or less resistance in series with the field coil, but also varies inversely the resistance offered by the shunt circuit. When all of resistance 9 is included in series with the field coil the shunt circuit offers zero resistance. Hence, no current whatever will flow through the field coil, the generator will be entirely relieved of load, and the battery will be entirely protected from overcharge.

Another advantage of the arrangement shown is the fact that where the generator circuit includes an automatic regulating relay such as that shown at 11 and 12 for introducing a resistance in the field coil circuit, the potentiometer does not materially modify the point in the range of generator speeds at which said relay ordinarily operates. Where a variable resistance in series with the field coil is employed in an effort to regulate the generator, such resistance throws the operation of the automatic relay beyond the range of speeds at which the generator usually operates.

Another very important advantage of the use of the particular circuit herein disclosed, lies in the fact that at no time can the total resistance in the third brush circuit exceed the value of resistance 9, which as above noted, is only slightly in excess of the resistance of the field coil itself. Under practically all circumstances the resistance will be less than that of the original generator circuit, thus protecting the windings.

Where a resistance in series is used between the third brush and the field coil as the sole means of regulation, such a resistance may be set suddenly to a very high value in order to reduce the charging rate to a point where it will do no serious damage to the battery. The effect of this very high resistance in the third brush circuit while the field is still energized, may result in a short circuiting of the armature coils. This is avoided where the total resistance in the circuit is maintained at a low point through the means herein disclosed.

Figure 2:
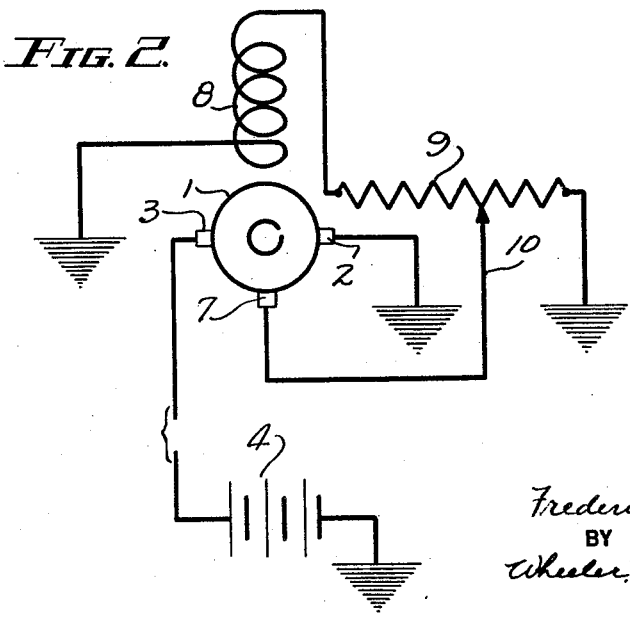
Figure 2 shows a modified circuit diagram including different potentiometer connections.

The circuit disclosed in Fig. 1 is all conventional with the exception of the potentiometer including resistance 9 and moving contact 10. Such a potentiometer or variable shunt resistance interacts with various other elements of the circuit in the manner above noted, regardless of whether it is connected as shown or is otherwise connected. The potentiometer may also be used with its resistance connected between the field coil and ground, and its moving contact connected with the third brush as shown in Fig. 2. Both in Fig. 2 and Fig. 1 the portion of the resistance in series with the field coil and that shunting the field coil are varied inversely as the movable contact is actuated.

It will be noted, however, both as to Fig. 1 and Fig. 2, that the control of the field circuit in accordance with the disclosure of my application is quite largely dependent on that portion of the resistance which is shunted around the field coil. This is the cause of a much finer and more accurate control and, at the same time, a wider range of control than is possible through the use of a mere variable series resistance. Actual tests show that the device herein disclosed will not heat nearly as much as a series resistance alone, and that it is possible to set the third brush permanently and control the generator output entirely through the potentiometer. In a circuit using a variable series resistance the range of control is so slight that it is still necessary to make seasonal adjustments of the third brush.

While the disclosed type of control may be used to regulate any output circuit where overloading of the windings is to be avoided, it has particular advantages when used to control battery charging rates under circumstances such that it co-acts with other elements of an automotive battery charging circuit as herein disclosed.

I claim:

1. The combination with a generator having a pair of output brushes and a third brush and a field coil connected with one of said output brushes, of a potentiometer including a resistance connected in shunt across said field coil, and a movable contact operable across said resistance and connected with said third brush.

2. The combination with a generator having a field coil, a pair of output brushes and a third brush, of circuit means connecting said field coil between said third brush and one of said other brushes and including a shunt circuit shunting said field coil and variable resistances in both of said circuits, and adjustable means for concurrently varying inversely the respective resistances of the field coil circuit and the shunt circuit.

3. The combination with a generator having a pair of output brushes, a third brush and a field coil, of circuit means connecting said field coil to one of the generator output brushes, and means including a potentiometer for connecting the third brush, the field coil and the other of said output brushes, whereby the energy of said third brush may be delivered substantially entirely to the field coil or substantially entirely to said other output brush, said potentiometer including a resistance, and means for adjustably varying the relative proportion of such resistance included in circuit between the third brush and the field coil on the one hand, and between the third brush and the said other output brush on the other hand.

4. The combination with a generator having a field coil, a pair of output brushes and a third brush providing current for the field coil, of a potentiometer connecting said third brush, said field coil and one of said first mentioned brushes, said field coil being connected at its other end to an output brush, and said potentiometer including a resistance shuntable to a greater or lesser degree and to an extent including substantially none of said resistance across said field coil, and a contact manually adjustable to control the extent to which said resistance is thus shunted across the field coil, whereby to provide relatively variably resistant circuits respectively including and shunting said field coil to regulate the strength thereof, such strength remaining a substantially constant factor as adjusted owing to the automatic regulating effect of the third brush.

5. The combination with a generator including a pair of output brushes, a third brush, and a field coil connected with one of said output brushes, of a variable resistance between said field coil and the third brush, a variable resistance between said field coil and an output brush, and means for varying the ratio between said resistances through a range sufficient to substantially eliminate one of said resistances.

6. The combination with a generator including a pair of output brushes, of a field coil connected with one of said brushes, an output-regulating third brush adapted to supply current to said field coil, and circuit means including a potentiometer having its terminals connected respectively with said field coil and third brush and the other output brush of the generator; said potentiometer having means including a resistance and a manually movable contact for varying as between said field coil and said other output brush the proportionate current output of said third brush supplied thereto.

7. The combination with a generator including a pair of output brushes, of a field coil connected with one of said brushes, an output-regulating third brush adapted to supply current to said field coil, and circuit means including a potentiometer having its terminals connected respectively with said field coil and third brush and the other output brush of the generator; said potentiometer having means including a resistance and a manually movable contact for varying as between said field coil and said other output brush the proportionate current output of said third brush supplied thereto, the moving contact of said potentiometer being adjustable to a position such as to substantially eliminate said resistance from the circuit between said third brush and one of the other terminals of said potentiometer.

8. The combination with a generator including a pair of output brushes, of a field coil connected with one of said brushes, an output-regulating third brush adapted to supply current to said field coil, and circuit means including a potentiometer having its terminals connected respectively with said field coils and third brush and the other output brush of the generator; said potentiometer having means including a resistance and a manually movable contact for varying as between said field coil and said other output brush the proportionate current output of said third brush supplied thereto, the moving contact of said potentiometer being adjustable to a position such as to substantially eliminate said resistance from the circuit between said third brush and one of the other terminals of said potentiometer, said movable potentiometer contact being adjustable throughout a range such as to selectively eliminate from circuit substantially all of the resistance between said third brush and said last mentioned potentiometer terminal.

9. The combination with a generator having first and second output brushes and a third, field-charging brush, and a field winding connected with said third brush and energized therefrom, of an adjustable potentiometer connected between certain of said brushes and said field coil and adjustable to regulate the flow of current through said winding, whereby selectively to determine the voltage across said output brushes.

10. The combination with a generator having a field winding and unitary means for supplying a substantially constant current thereto throughout a relatively wide range of generator speeds, whereby the output of said generator will be substantially constant throughout said range, of an adjustable potentiometer connected between said means and said field winding and provided with a shunt circuit around said winding, said potentiometer being adjustable to control the relative amount of current as between said winding and said shunt circuit, whereby to regulate the amount of current developed by said generator and maintained constant by said means.

FREDERICK J. PEASE.